US012774024B2

(12) United States Patent
Kammeyer

(10) Patent No.: US 12,774,024 B2
(45) Date of Patent: Oct. 27, 2026

(54) HANDS FREE JOGGING HARNESS

(71) Applicant: Lisa Kammeyer, Lakewood, CO (US)

(72) Inventor: Lisa Kammeyer, Lakewood, CO (US)

( * ) Notice: Subject to any disclaimer, the term of this patent is extended or adjusted under 35 U.S.C. 154(b) by 306 days.

(21) Appl. No.: 18/600,509

(22) Filed: Mar. 8, 2024

(65) Prior Publication Data

US 2024/0308565 A1 Sep. 19, 2024

Related U.S. Application Data

(60) Provisional application No. 63/489,791, filed on Mar. 13, 2023.

(51) Int. Cl.
*B62B 5/06* (2006.01)

(52) U.S. Cl.
CPC .................................... *B62B 5/068* (2013.01)

(58) Field of Classification Search
CPC ...................................................... B62B 5/068
See application file for complete search history.

(56) References Cited

U.S. PATENT DOCUMENTS 4,848,780 A 7/1989 Straub
5,106,108 A 4/1992 Howell
5,265,891 A 11/1993 Diehl
5,375,861 A 12/1994 Gifford
6,131,917 A * 10/2000 Walsh ..................... B62B 5/068 280/47.131
7,549,648 B2 * 6/2009 Girard ................... B62B 5/0438 280/47.32
2006/0081664 A1 * 4/2006 Yeung .................. B62D 63/064 280/47.131
2023/0202546 A1 * 6/2023 Kelling ..................... B62B 1/12 180/19.1

FOREIGN PATENT DOCUMENTS

DE 202014007325 U1 * 10/2014 ............ B62B 5/064

OTHER PUBLICATIONS

Photo of jogger with product from kidrunners.com, Screenshot taken Feb. 24, 2023.
Instagram photo of jogger titled "Kidrunner," Timeline Photos dated Oct. 20, 2015.

(Continued)

*Primary Examiner* — Minnah L Seoh
*Assistant Examiner* — Hosam Shabara
(74) *Attorney, Agent, or Firm* — Trenner Law Firm, LLC; Mark Trenner

(57) ABSTRACT

A harness assembly for towing a carriage and or trailer is disclosed. An example harness assembly includes a first frame for connecting to the carriage or trailer, and a second frame connected at a first end portion to the first frame. The second frame also has a second end portion for connecting to a user. At least one rotatable member of the second frame provides side-to-side rotation of up to about 180 degrees between the user and the carriage or trailer. In an example, the first frame is rotatably attached to the second frame to provide for up-and-down movement between the first frame and the second frame, thereby adjusting to different height users and dissipating at least some of the motion from the user before the motion from the user reaches the carriage or trailer.

17 Claims, 11 Drawing Sheets

(56) References Cited

OTHER PUBLICATIONS

Google Search screenshot of CYBEX Hands-free Running Kits, Screenshot taken Feb. 24, 2023.
Coxworth, Ben, "kidRunner makes it easier to take tykes along on your run" available online at https://newatlas.com/kidrunner-running-child-trailer/37308/ dated May 4, 2015.

* cited by examiner

HANDS FREE JOGGING HARNESS

PRIORITY CLAIM

This application claims the priority filing benefit of U.S. Provisional Patent Application No. 63/489,791 filed Mar. 13, 2023 for "Hands Free Jogging Harness" of Lisa Kammeyer, hereby incorporated by reference in its entirety as though fully set forth herein.

BACKGROUND

Baby carriages are available which mount to an individual participating in a jogging/walking event. So far, it appears that the commercial success of any of the embodiments in the prior art is hindered by their execution. Most of the prior art has been fashioned after a sulky carriage and rigid shaft configuration.

The rigidity of the shaft that is affixed to the platform or frame of the carriage and either mounted to the small of the runner's back or even worse clipped to a belt on either side of the runner's waist is problematic because if the runner were to fall, the shaft(s) could possibly cause injury and also possibly flip the carriage over.

The aforementioned rigidity of the shaft(s) can mean that the runner must always have ample room to turn (e.g., around corners) while running.

The aforementioned rigidity of the shaft(s) can also hinder or altogether prevent the user from accessing the occupant in the carriage (e.g., a baby or small child).

DETAILED DESCRIPTION

Figure 1:
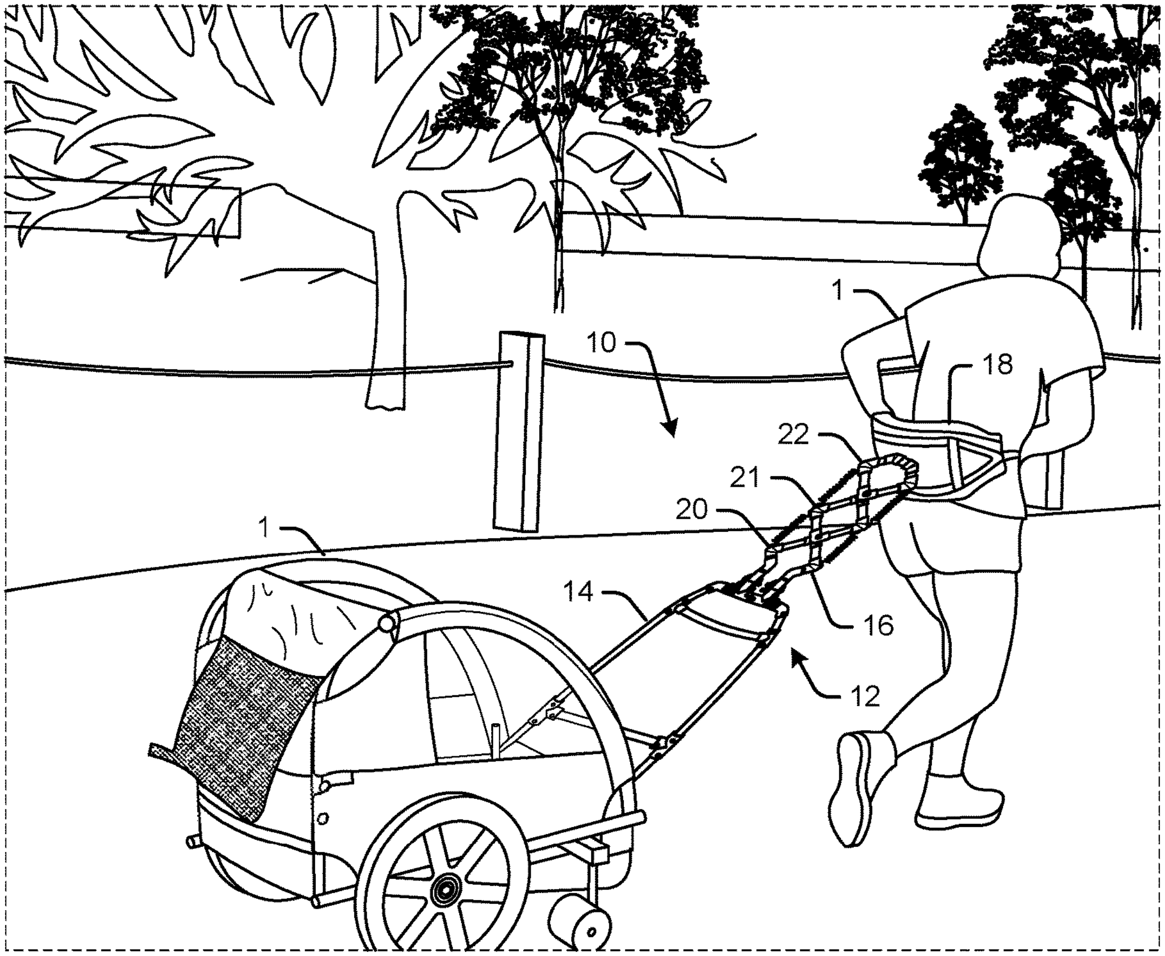
FIG. 1 is an illustration of an example hands free jogging harness or harness assembly as it may be connected between a carriage and a person pulling the carriage.

A hands free jogging harness or harness assembly is disclosed as it may be implemented for connecting a carriage or trailer to a user (e.g., a jogger, runner, or walker), and provide a means to safely and effectively bring an occupant such as a baby, small child or pet along while out running or walking. An example harness assembly for towing the carriage or trailer includes a first frame for connecting to the carriage or trailer, and a second frame. The second frame is connected at a first end portion to the first frame. The second frame is also connected at a second end portion to a user. At least one rotatable member of the second frame provides side-to-side (e.g., right to left side of the user) movement or rotation. In an example, up to about 180 degrees of movement is provided between the user and the carriage or trailer so that the user can turn completely around and access the occupant or other items in the carriage or trailer.

In an example, a rotational interconnect rotatably attaches the first frame to the second frame. The rotational interconnect provides for up-and-down movement between the first frame and the second frame. This up-and-down movement enables ease of use for different height users. This up-and-down movement between the frames also helps to dissipate at least some of the motion generated by the user (e.g., while running or walking) before the motion from the user reaches the carriage or trailer. This shock-absorbing feature can help provide a smoother ride for the occupant.

In an example, the second frame has a plurality of linking members between the first end portion and the second end portion. At least some of the linking members have substantially square or diamond shaped configurations. The linking members can be attached to one another at the corners or vertices of the adjacent square or diamond shaped linking members.

At least one biasing member can be provided between some or all of the linking members and/or otherwise provided between the first and second frame. The biasing member(s) can help to reduce sway while running, and can also help to maintain the linking members facing along a substantially straight line during use. The biasing member(s) can also aid in returning the linking members to a default position (e.g., straight ahead) after the user has turned partly or all the way around to face the carriage, and then turns back to face forward to continue on their run or walk.

The harness assembly can be affixed to the carriage/trailer by means of a hitch pin through the frame of the carriage/trailer and secured with a hairpin cotter pin or other removable connection. As such, the harness assembly moves up and down with the motion of the user independently of the carriage or trailer. The carriage or trailer is propelled forward with minimal jarring to the occupant of the carriage or trailer. In an example, the harness assembly also enables the user to turn in very tight spaces without having to disconnect the harness from their body and/or from the carriage or trailer.

In an example, the harness assembly is configured to be mounted to a modified baby bicycle trailer and belted to the jogger or runner, thereby providing ergonomic efficiency and comfort while exercising. The modified baby bicycle trailer, such as the one shown in the drawings, may have four wheels. The two wheels in the back may be larger than the two wheels in the front. The two wheels in the front can be configured to swivel. An optional brake system may also be provided. However, the harness assembly is not limited to use with any particular type or configuration of carriage or trailer.

Before continuing, it is noted that as used herein, the terms "includes" and "including" mean, but is not limited to, "includes" or "including" and "includes at least" or "including at least." The term "based on" means "based on" and "based at least in part on."

It is also noted that the examples described herein are provided for purposes of illustration, and are not intended to be limiting. Other devices and/or device configurations may be utilized to carry out the operations described herein.

The operations shown and described herein are provided to illustrate example implementations. It is noted that the operations are not limited to the ordering shown. Still other operations may also be implemented.

FIG. 1 is an illustration of an example hands free jogging harness or harness assembly 10 as it may be connected between a carriage or trailer 1 and a person 2 pulling the carriage or trailer 1. An example harness assembly 10 includes a frame structure 12 having two sections or frames 14 and 16.

A back member 18 having a belt or strap is configured to be worn by the user 2. The back member 18 may have suitable padding or other material to reduce friction and increase comfort while being worn by the user 2. In an example, a connection to the frame 16 of frame structure 12 is provided through the center of the inner portion of the back member 18, which enables rotation of the frame structure 12 relative to the user 2.

In an example, the frame 16 includes a structure formed by separate linked members 20, 21, and 22 (e.g., having a substantially square or diamond shape) that are connected together at opposite ends (e.g., at the vertices) of each other in a stacked configuration. In the example frame 16 shown in FIG. 1, there are three linked members 20, 21, and 22, although more or fewer linked members may be provided. In addition, the linked members 20, 21, and 22 may be any suitable shape and are not limited to the square or diamond shapes shown.

The linked members 20, 21, and 22 of the frame 16 are rotationally connected to one another in a configuration that allows the user 2 the unique ability to turn around up to about 180 degrees (e.g., partly or all the way around to face behind the user 2) and access contents and/or tend to the occupant of the carriage or trailer 1 while the user 2 remains attached to the harness and the trailer or carriage 1.

In an example, the back member 18 includes a rectangular convex shaped plastic backing to at least partly conform to the user's back. The plastic backing may be approximately 12 inches wide by 6 inches tall (although other sizes may be provided). The convex shape of the plastic backing is configured to fit onto the small of the back of the user 2. The plastic backing can be sandwiched between two portions or pieces of covered material, such as vinyl (although other materials may be provided). In addition, foam rubber or other material may be provided that is about 1 inch thick (although other thicknesses may be provided) to provide padding for the user 2.

In an example, a bolt (e.g., about 2 inches long) can be provided through the center of the inner member of foam rubber padding, the plastic backing, and the frame of the harness. A washer can be provided between the head of the bolt and a plastic portion of the back member 18. The bolt is secured with a lock nut. A washer can be provided between the back of the inner foam pad and the frame. Web strapping with an adjustable buckle can be sewn to the back of the inner foam pad so that the user 2 can comfortably secure the back member 18 to their waist.

In an example, the frames 14 and 16 of frame structure 12 can be made with, but not limited to, ¾ inch tubing. Of course, the frame structure 12 can be made with any appropriate material of any desired size or shape. In this example, the frame structure 12 has two distinct sections, the frame 14 and the frame 16. The top section or frame 16 can be approximately 20.5 inches in length and includes three linked members 20, 21, and 22.

In an example, the linked members 20, 21, and 22 are formed by separate 5.5 inch substantially square or diamond shaped members, bolted together at the opposite top and bottom points or vertices, in a stacked configuration relative to one another. The term stacked refers to, by way of non-limiting illustration, the arrangement shown in the drawings such as the front-most linked member 22 provided on top, the top of the middle linked member 21 is connected under the bottom of linked member 22, and the top of the rear-most linked member 20 is connected under the bottom of the middle linked member 22. Of course, other arrangements are also contemplated as being within the scope of this disclosure. Such an arrangement allows the linked members 20, 21, and 22 to rotate relative to one another so that the user is able to turn up to about 180 degrees relative to a forward facing position (e.g., to fully face behind the user 2) in order to access contents of and/or tend to an occupant in the carriage or trailer 1.

In an example, the side vertices of the linked members 20, 21, and 22 are connected together with biasing member(s) 25*a-d* (e.g., the springs shown in the drawings). The biasing members provide resistance during turning, helping to keep the linked members of the frame 16 facing forward during use, and helping to return the frame 16 to a forward facing position when the user 2 turns back around to face forward.

The actual shape and connection of the linked members 20, 21, and 22 is not intended to be limiting in any manner. Instead, the rotation or "hinging action" may also be accomplished by otherwise connecting ovals, circles, and/or any number of other types of shapes together.

In an example, the top diamond or most proximal linked member 22 to the user has three vertices and a flat portion at the top adjacent to the back member 18 for connecting thereto. An approximately 2 inch section of tubing is filed down at both ends into a conical shape and is received by 45 degree angled tubing joints. This configuration enables the 2 inch portion or piece of tubing to spin freely inside the joints. The padded back member 18 is bolted or otherwise connected to the frame structure 12 through the center of linked member 22. The back member 18 is thus able to rotate or spin a full 360 degrees relative to the frame 16. This configuration allows the harness assembly 10 to be adjusted to any height and/or movement of the user 2. Even if the user 2 loses balance or falls to the ground, this rotation can help keep the carriage or trailer 1 from tipping over onto its side.

In an example, middle linked member 21 has the shape of a full square or diamond. The top point or vertice of the middle linked member 21 is bolted under the bottom of the front-most linked member 22. The bottom point or vertice of the middle linked member 22 is bolted on top of the top point or vertice of the rear-most linked member 20. The rear-most linked member 20 has three points or vertices, and instead of coming to a point at the bottom, two 45 degree angle tubing joints face out and are affixed after the two side vertices, which results in two downwardly pointing parallel bars that connect to the frame 14.

In an example, a vertical connection (e.g., a ¾ inch tubing "T" joint) is bolted to the bottom of both ¾ inch tubing with removable double wire pto safety hitch pins. The slight difference in size between the ¾ inch tubing and the ¾ inch tubing is why the pto hitch pins are provided. The slight difference in size is deliberate and necessary to provide the undulating movement during use. The undulating movement absorbs the up and down motion of the wearer resulting in minimal jarring to the passenger of the trailer.

In an example, the frame 14 is spread apart (e.g., about 18 inches wide and about 15 inches long) to accommodate kicking feet of the user (e.g., while running). The bottom bar is also a lateral support in order to keep the frame from twisting. Continuing down on either side, the frame 14 splays back out so that it is able to be connected to either side of the carriage or trailer 1. Holes in the ends of frame 14 slip over hinge pins on the frame of the carriage or trailer 1, and are secured with cotter pins.

It is noted that the specific configuration, including materials, connections (e.g., bolts, pins, etc.), dimensions, and connectivity, are intended only as illustrative of an example harness assembly. Still other materials, dimensions, and means of connectivity will be readily apparent to those having ordinary skill in the art after becoming familiar with the teachings herein.

Figure 2:
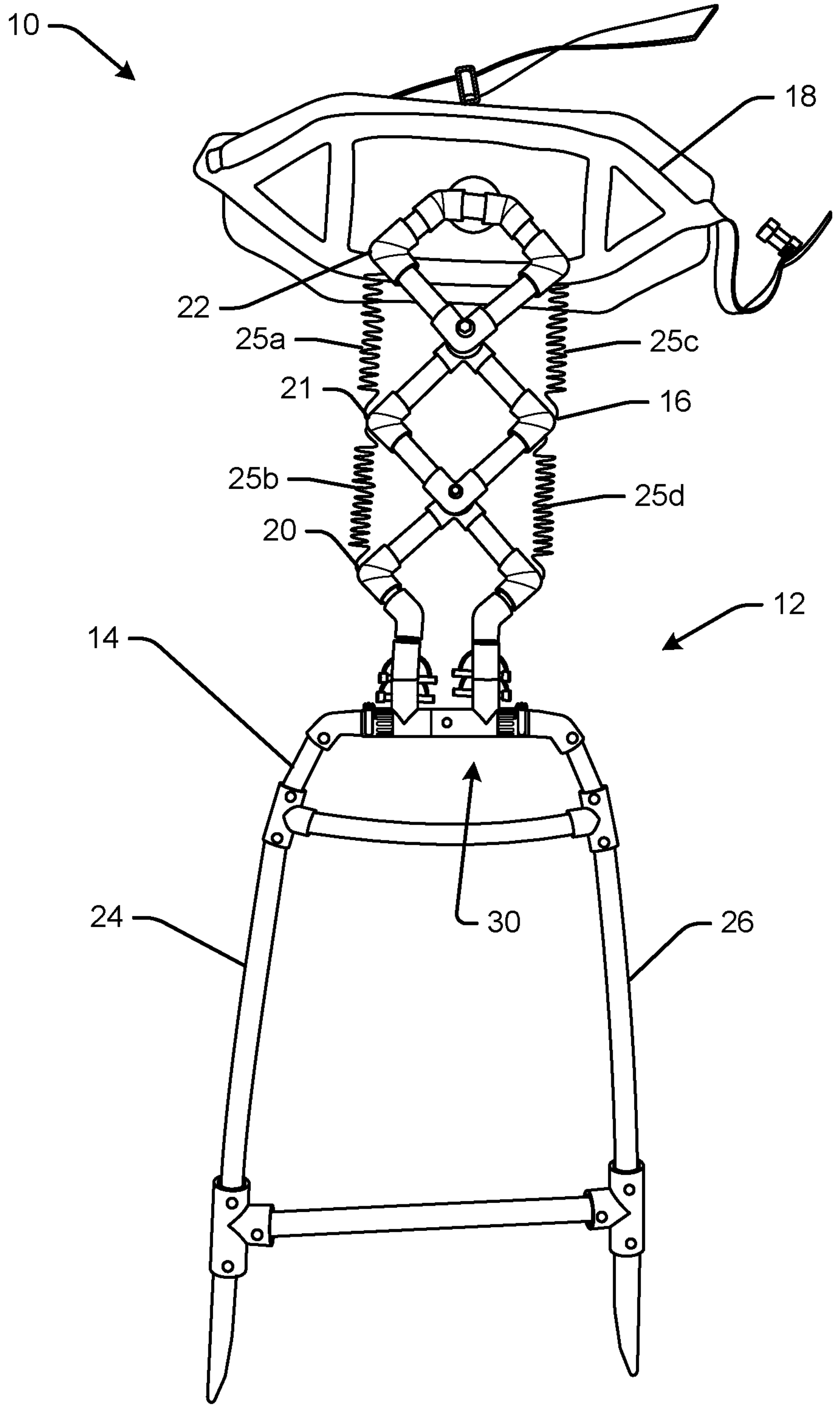
FIG. 2 is a perspective view of the example harness assembly in an unfolded configuration ready for use.
Figure 3:
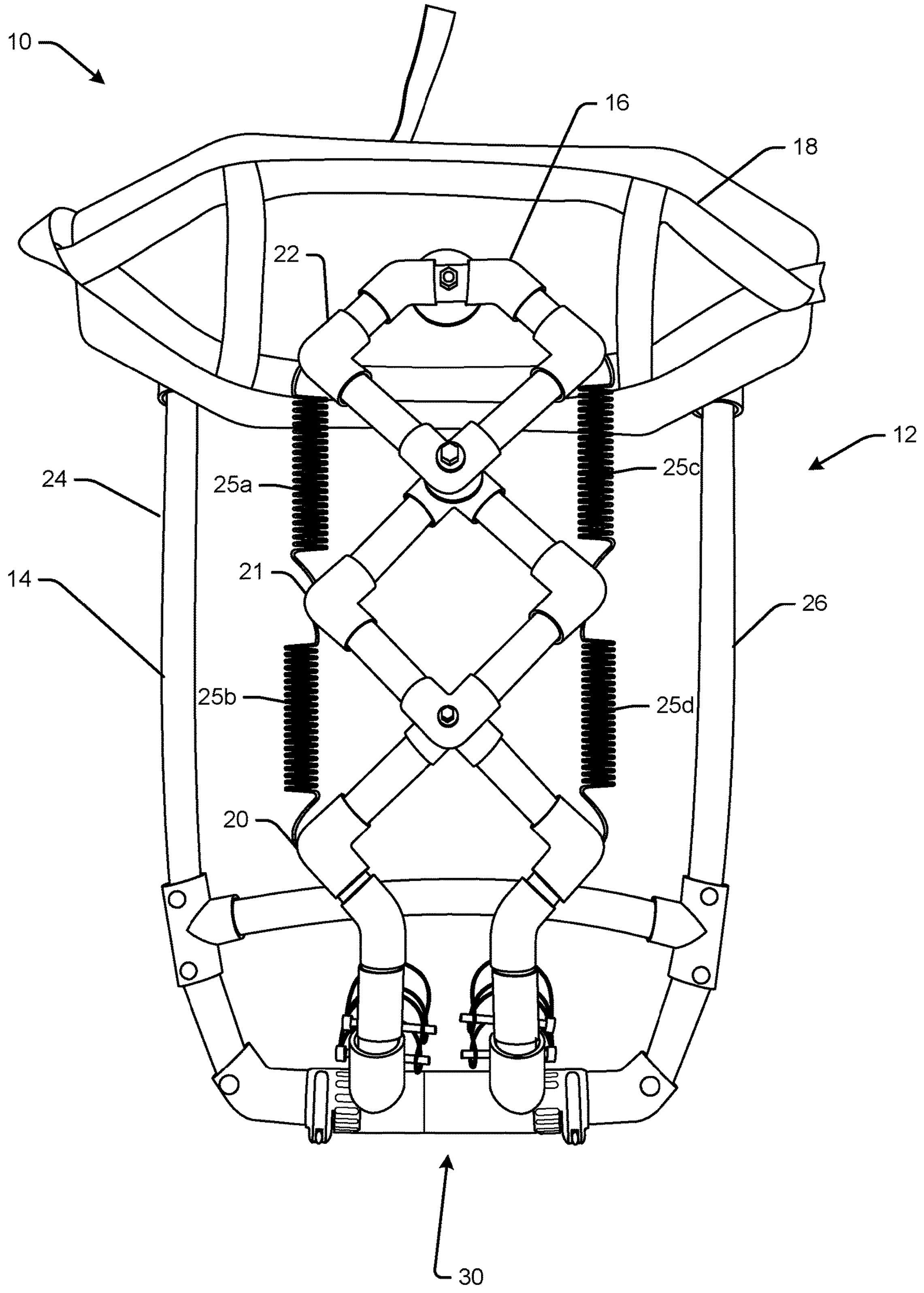
FIG. 3 is a perspective view of the example harness assembly in a folded configuration for storage or transport.

FIG. 2 is a perspective view of the example harness assembly 10, shown in an unfolded configuration ready for use. FIG. 3 is a perspective view of the example harness assembly 10, shown in a folded configuration for storage or transport.

The example harness assembly 10 is shown in FIGS. 2 and 3 including a first frame 14 of the frame structure 12. The first frame 14 is provided with connections for connecting to the carriage or trailer (see, e.g., FIG. 1). A second frame 16 of the frame structure 12 is connected at a first end portion to the first frame 14. The second frame 16 has a second end portion for connecting to a user (see, e.g., FIG. 1) via a back member 18. The back member 18 may be pivotally connected to the second end portion of the second frame 16.

The example harness assembly 10 is also shown in FIGS. 2 and 3 as the second frame 16 may include at least one rotatable member, or linking members 20, 21, and 22. The rotatable member(s) are configured (e.g., as linking members 20, 21, and 22) for providing side-to-side bending or rotation of up to about 180 degrees between the user and the carriage or trailer so that the user can turn part way or all of the way facing backward toward the carriage or trailer 1, even with the back member 18 strapped to about the user's waist.

In an example, the first frame 14 has a first leg 24 spaced apart from a second leg 26. The first leg 24 connects to the first side of the carriage or trailer 1, and the second leg 26 connects to the second side of the carriage or trailer 1.

Figure 4:
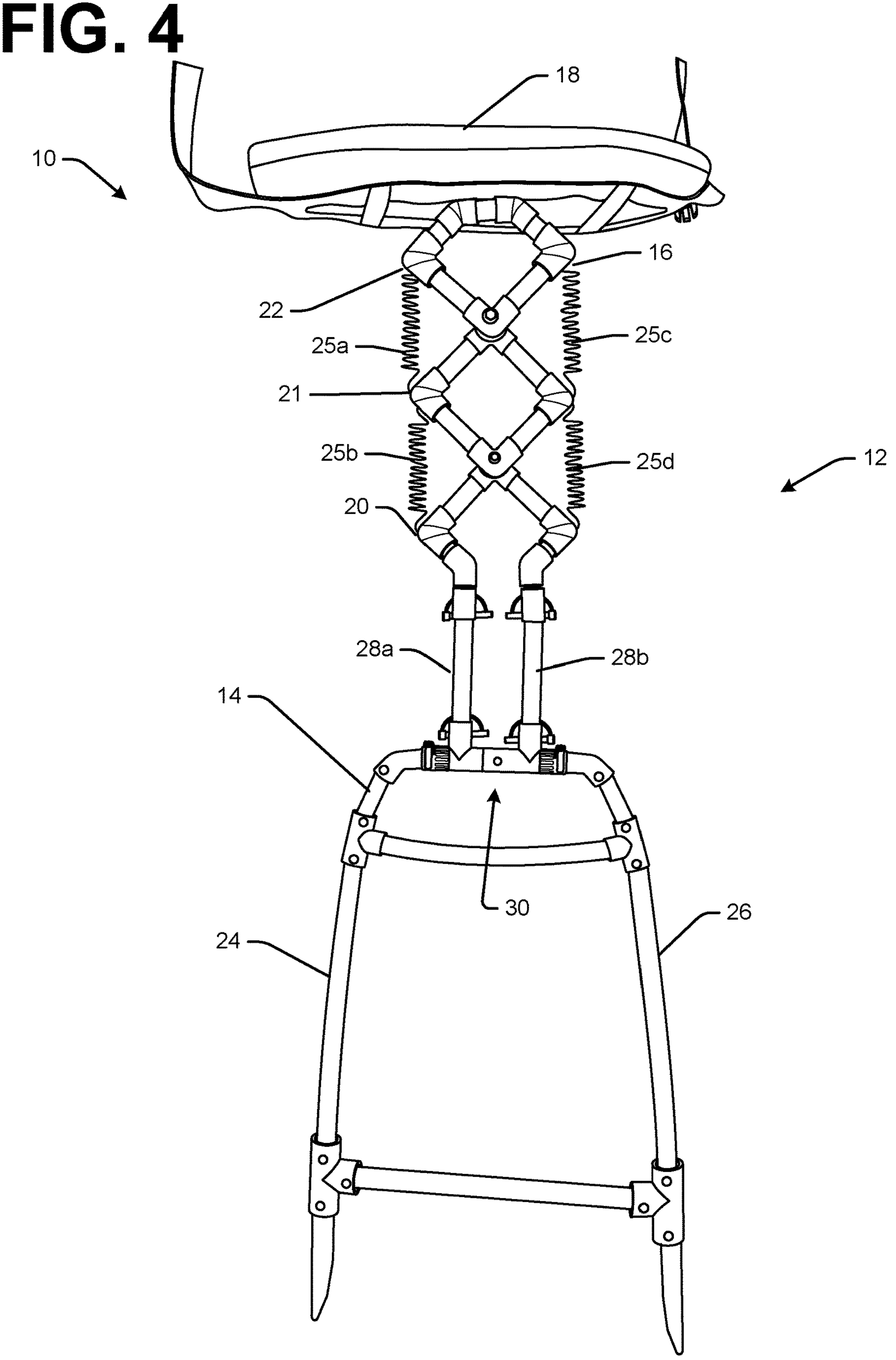
FIG. 4 is a perspective view of the example harness assembly with extension members for taller users to provide a greater distance between the carriage and the user.

FIG. 4 is a perspective view of the example harness assembly 10 with extension members 28*a*, 28*b*. The length of the frame structure 12 may be extended for taller users to provide a greater distance between the carriage and the user. In an example, the extension members 28*a*, 28*b* may connect to at least one of the first frame 14 and the second frame 16 to extend a length of the frame structure 12 between the user 2 and the carriage or trailer 1. In FIG. 4, the extension members 28*a*, 28*b* are shown provided between the first frame 14 and the second frame 16. But the extension members 28*a*, 28*b* may be provided on any part of the frame structure 12.

Figure 5:
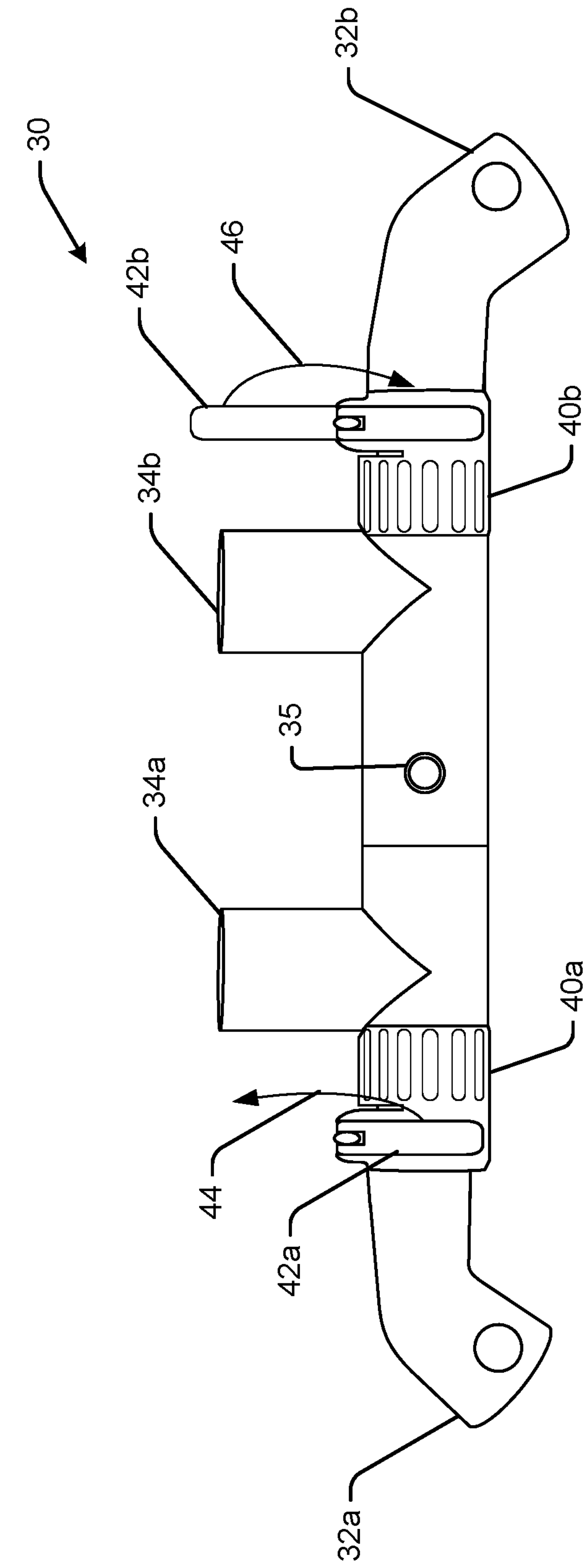
FIG. 5 is a perspective view showing an example interconnecting member of the example harness assembly.

FIG. 5 is a perspective view showing an example interconnecting member 30 of the example harness assembly 10. In an example, the interconnecting member 30 is provided as part of the frame 14, although it could be a part of the frame 16, or provided separately between the two frames 14 and 16. The interconnecting member 30 includes a releasable button mechanism 35 (e.g., button through opening) to connect the two portions having connections 32*a*, 32*b* for connecting into the side rails of frame 14. The interconnecting member 30 also includes connections 34*a*, 34*b* for connecting into the side rails of frame 16. The connections 32*a*, 32*b* rotate about an axis 36 relative to the connections 34*a*, 34*b* (e.g., as illustrated by arrow 38). Locking members 40*a*, 40*b* attach the upper assembly including connections 34*a*, 34*b* to the connections 32*a*, 32*b*. Locking members 40*a*, 40*b* include handles 42*a*, 42*b* that may be rotated up (e.g., in the direction of arrow 44) to loosen the hold on connections 32*a*, 32*b*. The handles 42*a*, 42*b* may be rotated down (e.g., in the direction of arrow 46) to tighten the hold on connections 32*a*, 32*b*.

The interconnecting member 30 rotatably attaches the first frame 14 to the second frame 16. This provides for up-and-down movement between the first frame and the second frame. As such, the harness assembly 10 can be adjusted to different height users and dissipates at least some of the motion from the user before the motion from the user reaches the carriage or trailer.

In addition, the interconnecting member 30 enables the first frame 14 to be folded relative to the second frame 16, such that the first frame 14 and the second frame 16 fold into a storage position (e.g., as shown in FIG. 3). The first frame 14 and the second frame 16 also fold away from each other into an operating position (e.g., as shown in FIG. 2). In an example, the first frame 14 can be disconnected from the second frame 16, e.g., for storage and/or shipping.

Other examples of interconnecting the first frame 14 to the second frame 16 are also contemplated as being within the scope of this disclosure. In addition, the terms "first" and "second" only serve to distinguish these and have no other numerical meaning.

Figure 6:
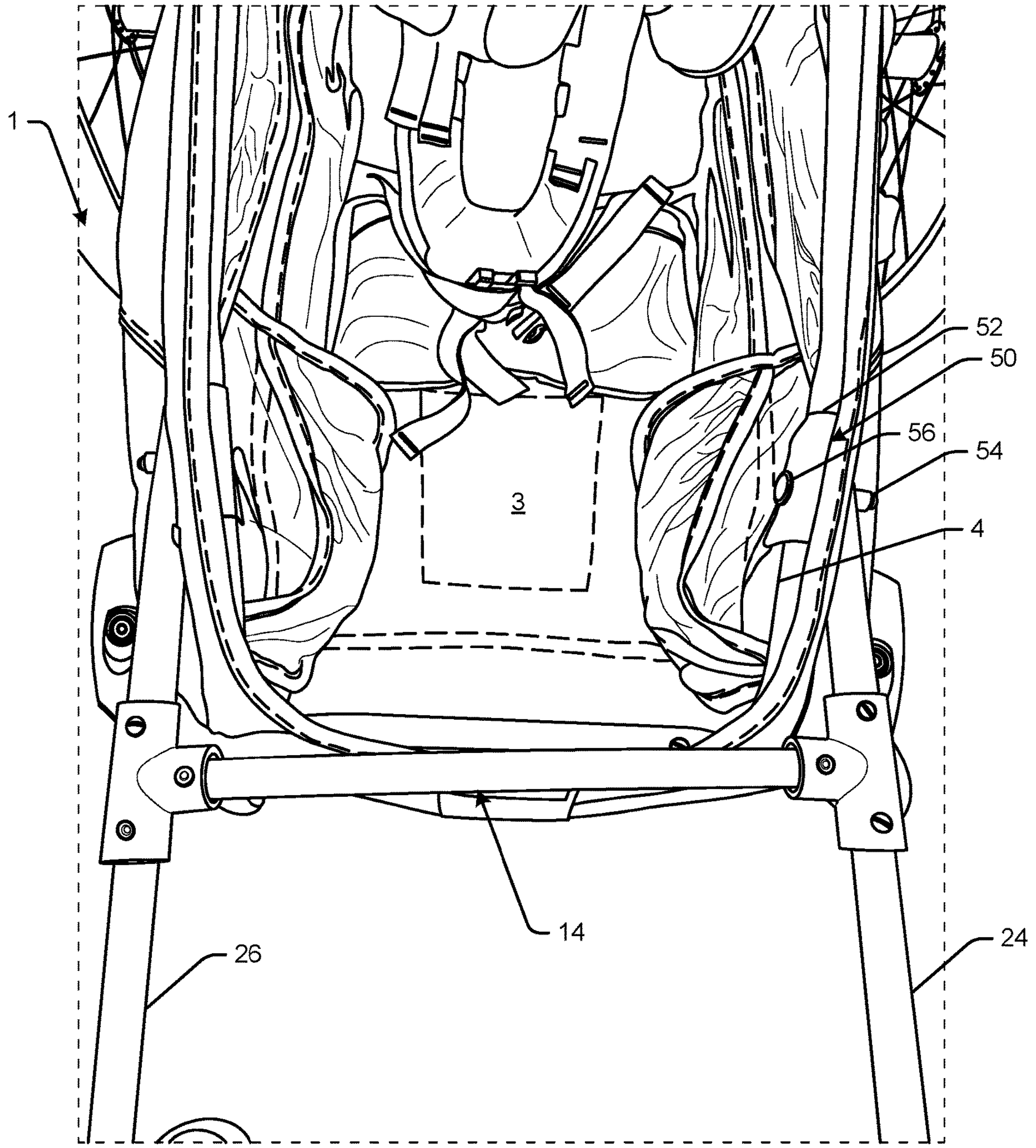
FIGS. 6 and 7A-7B illustrate connecting the example harness assembly to a carriage.
Figure 7B:
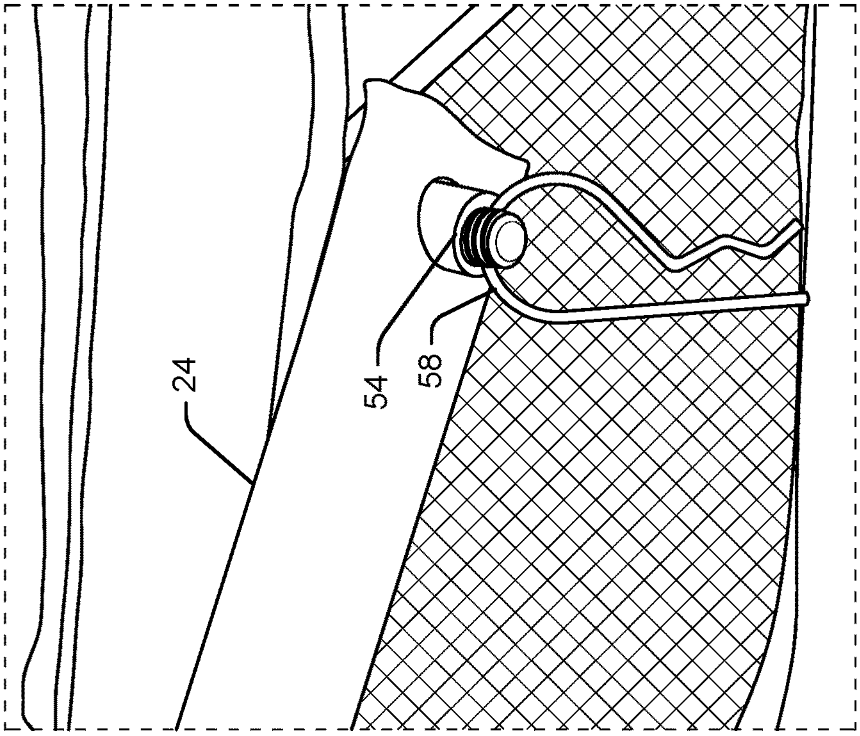
Figure 7A:
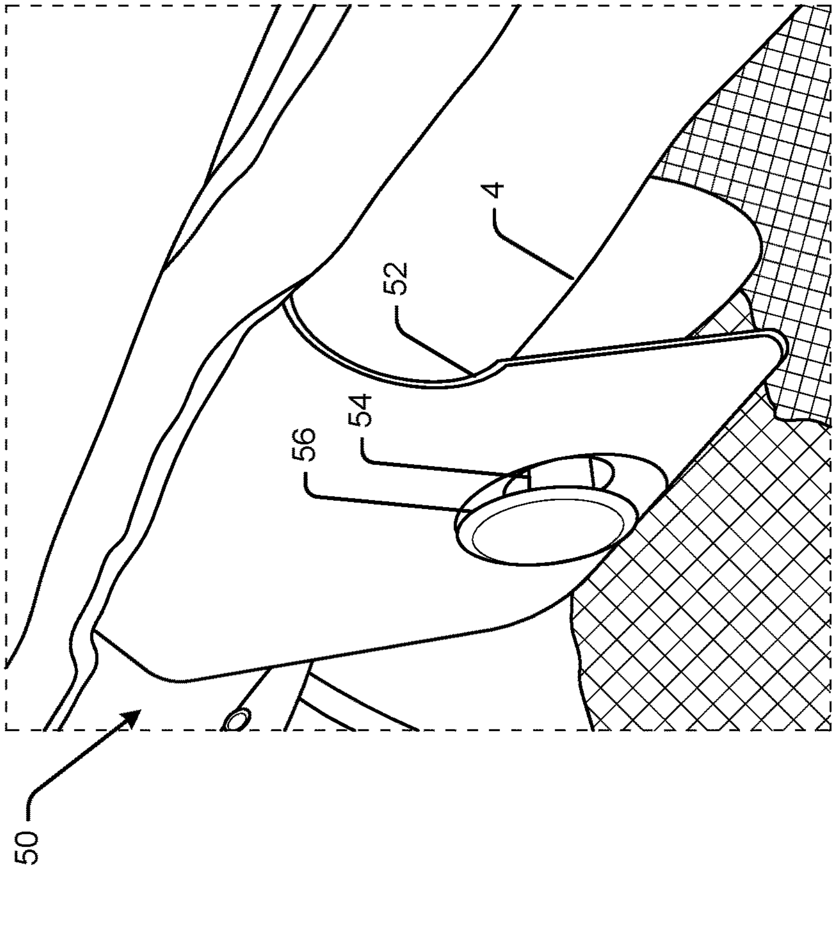

FIGS. 6 and 7A-7B illustrate connecting the example harness assembly 10 to a carriage or trailer 1. In this example, the first leg 24 and second leg 26 may be connected to the trailer at connection 50. Connection 50 is shown in more detail on an inside view (facing toward the passenger area 3 of the trailer 1) in FIG. 7A, and an outside view (facing away from the passenger area 3 of the trailer 1) in FIG. 7B. in FIG. 7A, a clip 52 is shown as it may wrap around the tubing or trailer frame 4 of the trailer 1. Clips may be provided on each side of the trailer 1, for connecting with first leg 24 on one side, and second leg 26 on the other side. A pin 54 is provided through an opening in the clip 52 and below the trailer frame 4. As such, no holes need to be provided in or drilled through the trailer frame 4, which could otherwise potentially weaken the trailer frame 4. A pinhead 56 holds the pin 54 on one end, and the pin extends through the openings in the clip 52 and a hole through the respective legs 24, 26. An R-clip 58 (or other removable clip such as a key ring) secures pin 54 on the other side, thereby connecting the legs 24, 26 to the trailer frame 4.

Figure 8:
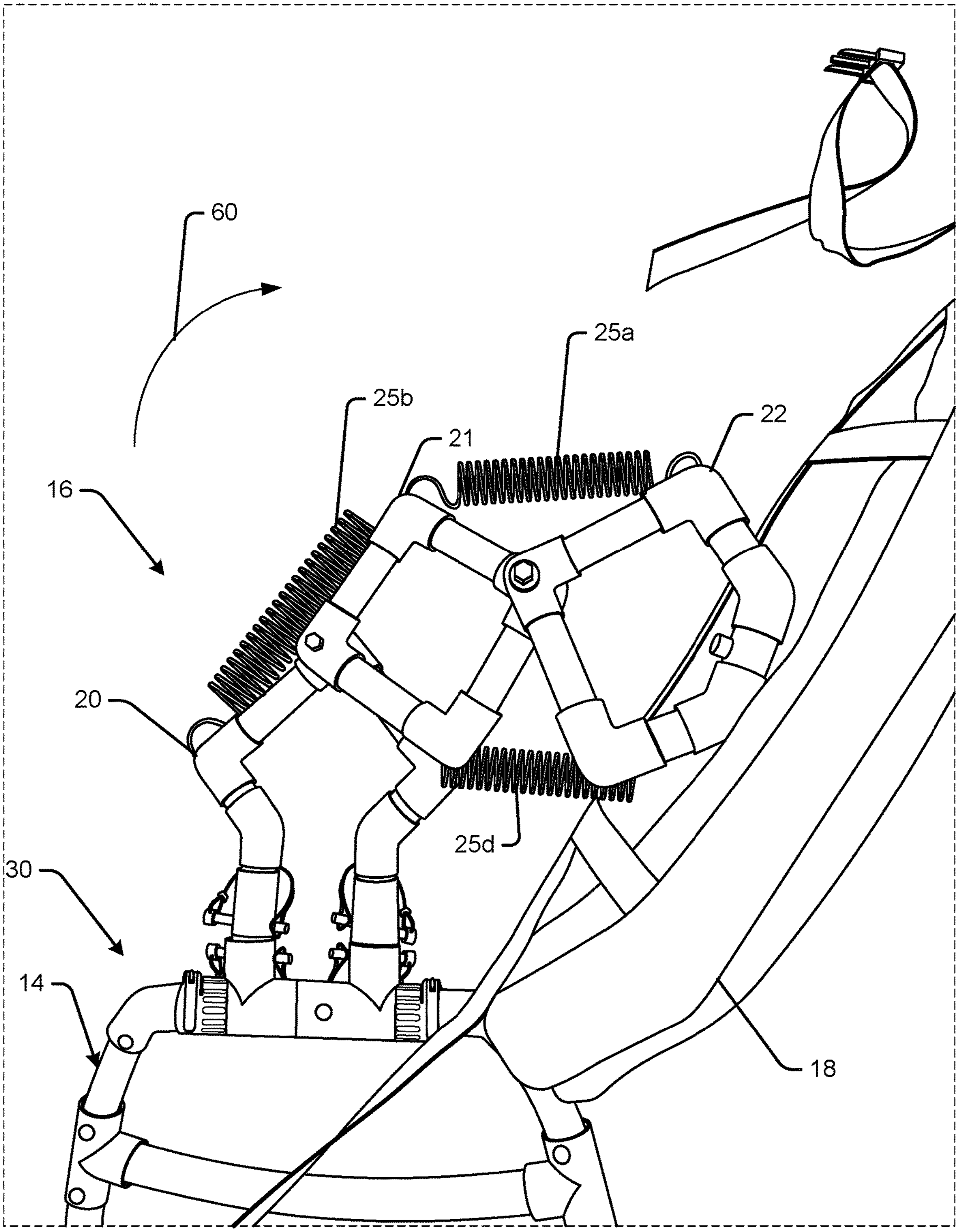
FIG. 8 is a top perspective view showing turning of the example harness assembly.
Figure 9:
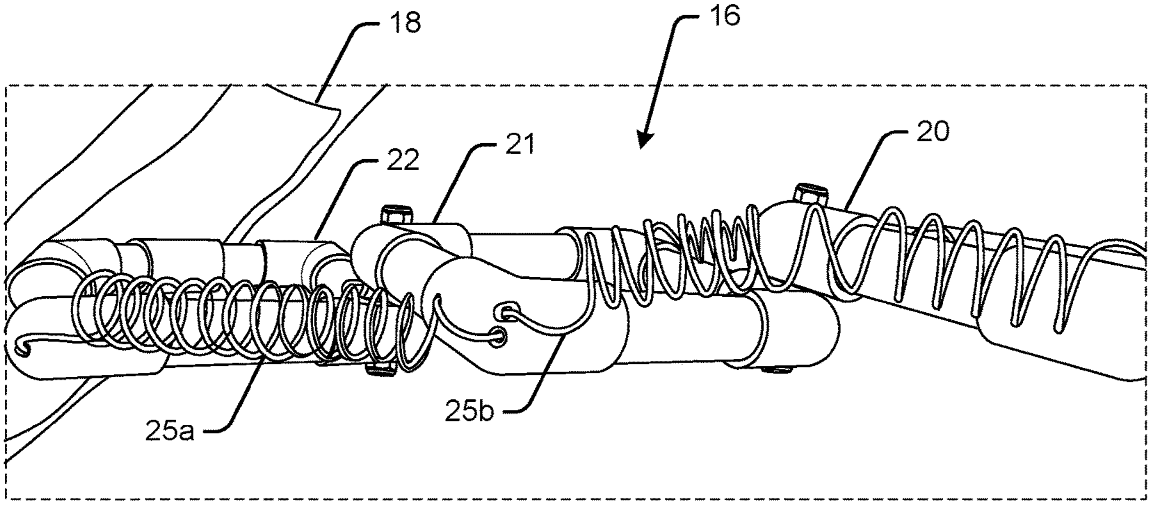
FIG. 9 is a side perspective view corresponding to FIG. 8 showing turning of the example harness assembly.

FIG. 8 is a top perspective view showing a turning operation of the example harness assembly 10. FIG. 9 is a side perspective view corresponding to FIG. 8 showing the turning operation of the example harness assembly 10.

In an example, the linking members 20, 21, and 22 have substantially square or diamond shaped configurations. The linking members 20, 21, and 22 are attached to one another at the vertices to enable rotation. Rotation is shown to the right side of the drawing in FIG. 8 (e.g., in the direction of arrow 60. Rotation may also be to the left side. As such, the user can turn up to about 180 degrees to the right and to the left.

In an example, the linking member 20 is connected to the first frame 14. The linking member 22 is connected to the back member 18 for attaching to the user 2. The third linking member 21 is pivotally connected between the linking member 20 and the linking member 22. The linking member 22 pivots from side-to-side relative to both the linking member 20 and the linking member 22.

In an example, the linking member 22 does not pivot side-to-side relative to the back member 18, to provide rigidity in the connection. However, the linking member 22 does pivot up-and-down relative to the back member 18.

In an example, the linking member 20 does not pivot side-to-side relative to the first frame 14, to provide rigidity in the connection.

In an example, biasing members 25*a-d* are provided on each side of the frame 16. The biasing members 25*a-d* provide resistance against sideways rotation of the second frame. The biasing members 25*a-d* may also assist in straightening or returning the frame 16 to a forward facing operating direction after the frame 16 has been rotated to one of the sides and the user returns to a forward facing direction.

Figure 10:
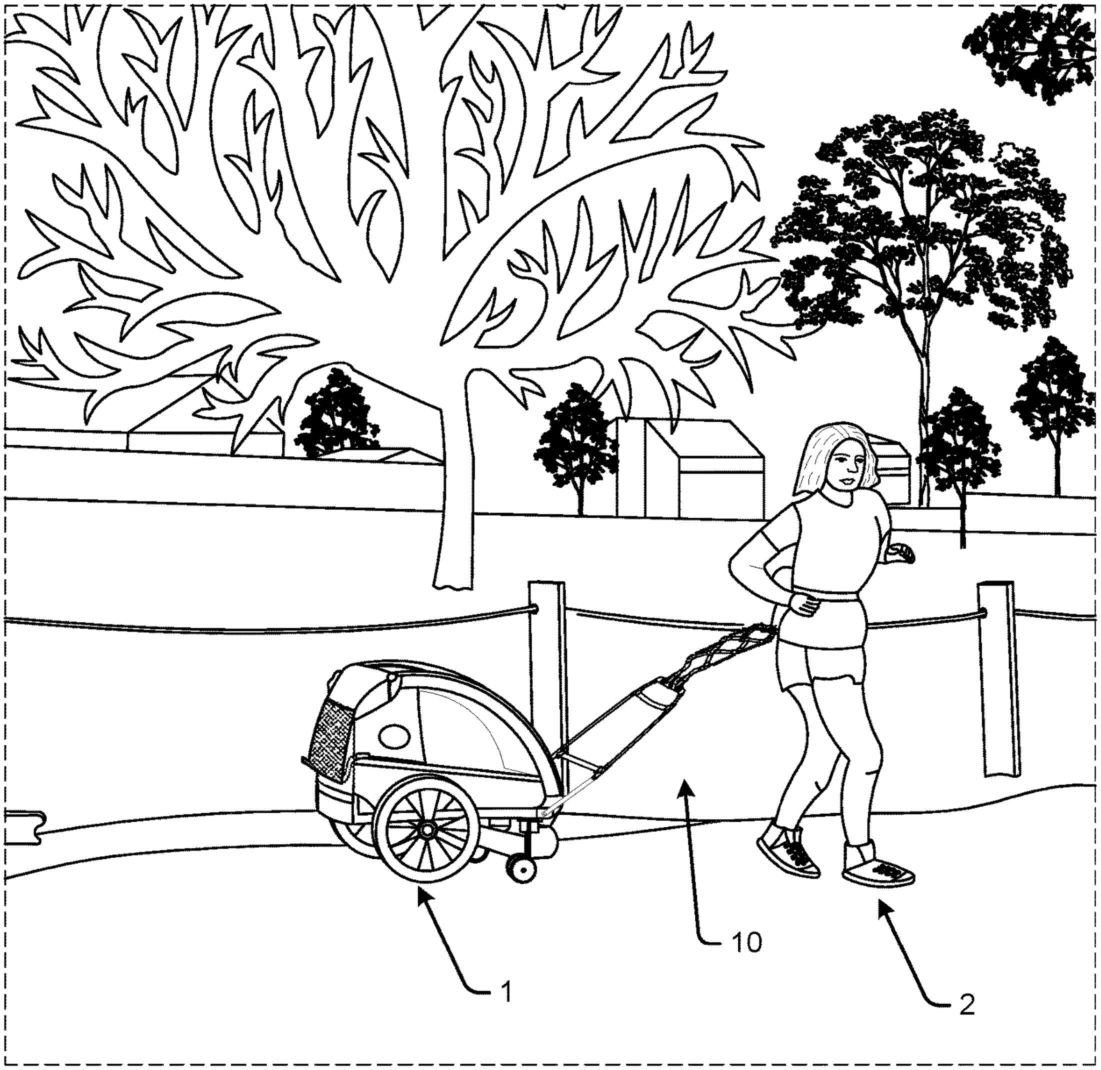
FIGS. 10 and 11 are illustrations of the example harness assembly as it may be connected between a carriage and a person pulling the carriage, showing example turning operations.
Figure 11:

FIGS. 10 and 11 are illustrations of example turning operations with the harness assembly 10 connected between a carriage or trailer 1 and a user 2 pulling the carriage or trailer 1. FIG. 10 shows the user 2 able to make tight turns when running, even while remaining connected to the example harness assembly 10 and carriage or trailer 1. FIG. 11 shows the user 2 turned nearly completely around (e.g., about 180 degrees). As such, the user 2 is facing back toward the carriage or trailer 1, and is able to reach into the carriage or trailer 1 to access the contents and/or tend to the passenger (e.g., a baby or child), without having to disconnect the example harness assembly 10 or the carriage or trailer 1.

It will also be readily apparent that conventional means of an infant/child/pet accompanying a person while running has meant that the runner would push the occupant of a traditional jogging stroller whereby the runner has to hold on to the handle and steer the stroller. Trying to run or jog while steering a conventional jogging stroller may require the user to hunch over and shorten their stride causing an unnatural gait. This is not necessary with the harness assembly 10. Instead, the user 2 is able to keep a correct posture and walk or run just as if the carriage or trailer 1 was not connected to the user 2. Likewise, when going down a hill or slope, the user 2 is not run over by the carriage or trailer 1 when using the example harness assembly 10.

It is noted that the examples shown and described are provided for purposes of illustration and are not intended to be limiting. Still other examples are also contemplated.

The invention claimed is:

1. A harness assembly for towing a carriage or trailer, comprising:
- a first frame for connecting to the carriage or trailer;
- a second frame connected at a first end portion to the first frame, the second frame having a second end portion for connecting to a user; and
- at least one rotatable member of the second frame, the at least one rotatable member providing side-to-side rotation of up to about 180 degrees between the user and the carriage or trailer;
- wherein the second frame has a plurality of linking members between the first end portion and the second end portion;
- wherein at least some of the plurality of linking members have substantially square or diamond shaped configurations, and wherein the plurality of linking members are attached to one another at the vertices.

2. The harness assembly of claim 1, wherein the second frame includes at least one linking member between the first end portion and the second end portion.

3. The harness assembly of claim 1, further comprising at least one biasing member on each side of the second frame, the at least one biasing member providing resistance against sideways rotation of the second frame.

4. The harness assembly of claim 3, wherein the at least one biasing member assists in returning the second frame to a forward facing operating direction after the second frame is rotated to one of the sides.

5. The harness assembly of claim 1, further comprising a first linking member connected to the first frame, a second linking member connected to a back member for attaching to the user, and a third linking member pivotally connected between the first linking member and the second linking member.

6. The harness assembly of claim 5, wherein the third linking member pivots from side-to-side relative to both the first linking member and the second linking member.

7. The harness assembly of claim 5, wherein the first linking member does not pivot side-to-side relative to the back member.

8. The harness assembly of claim 7, wherein the first linking member does pivot up-and-down relative to the back member.

9. The harness assembly of claim 5, wherein the second linking member does not pivot side-to-side relative to the first frame.

10. The harness assembly of claim 1, wherein the first frame is rotatably attached to the second frame to provide for up-and-down movement between the first frame and the second frame, thereby adjusting to different height users and dissipating at least some of the motion from the user before the motion from the user reaches the carriage or trailer.

11. The harness assembly of claim 1, wherein the first frame is foldable relative to the second frame, such that the first frame and the second frame fold toward into a storage position, and the first frame and the second frame fold away from each other into an operating position.

12. The harness assembly of claim 1, wherein the first frame has a first leg spaced apart from a second leg, the first leg connecting to a first side of the carriage or trailer, and the second leg connecting to a second side of the carriage or trailer.

13. The harness assembly of claim 1, wherein the first frame disconnects from the second frame.

14. The harness assembly of claim 1, further comprising at least one extension member connecting to at least one of the first frame and the second frame to extend a length between the user and the carriage or trailer.

15. The harness assembly of claim 1, further comprising a back member for attaching to the user, the back member pivotally connected to the second end portion of the second frame.

16. A harness assembly for towing a carriage or trailer, comprising:
- a first frame for connecting to the carriage or trailer;
- a second frame connected at a first end portion to the first frame, the second frame having a second end portion for connecting to a user;
- at least one rotatable member of the second frame, the at least one rotatable member providing side-to-side rotation of up to about 180 degrees between the user and the carriage or trailer; and
- a rotational interconnect to rotatably attach the first frame to the second frame, the rotational interconnect providing for up-and-down movement between the first frame and the second frame for different height users and for dissipating at least some of the motion from the user before the motion from the user reaches the carriage or trailer;
- wherein the second frame has a plurality of linking members between the first end portion and the second end portion, at least some of the plurality of linking members have substantially square or diamond shaped configurations, and wherein the plurality of linking members are attached to one another at the vertices.

17. The harness assembly of claim 16, further comprising at least one biasing member between the plurality of linking members.

* * * * *